United States Patent [19]

Novak

[11] Patent Number: 4,760,882

[45] Date of Patent: Aug. 2, 1988

[54] METHOD FOR PRIMARY CEMENTING A WELL WITH A DRILLING MUD WHICH MAY BE CONVERTED TO CEMENT USING CHEMICAL INITIATORS WITH OR WITHOUT ADDITIONAL IRRADIATION

[75] Inventor: Lucille H. Novak, Houston, Tex.

[73] Assignee: Exxon Production Research Company, Houston, Tex.

[21] Appl. No.: 463,216

[22] Filed: Feb. 2, 1983

[51] Int. Cl.[4] .................................. E21B 33/14
[52] U.S. Cl. ........................................ 166/295
[58] Field of Search .............. 166/247, 292, 293, 294, 166/295; 175/65, 70

[56] References Cited

U.S. PATENT DOCUMENTS

| 2,672,937 | 3/1954 | Kaveler | 166/293 |
|---|---|---|---|
| 2,705,050 | 3/1955 | Davis et al. | 166/293 |
| 3,114,419 | 12/1963 | Perry et al. | 166/295 |
| 3,168,139 | 2/1965 | Kennedy et al. | 166/292 |
| 3,199,589 | 8/1965 | Boyd et al. | 166/295 |
| 3,409,093 | 11/1968 | Cunningham et al. | 166/293 |
| 3,557,876 | 1/1971 | Tragesser | 166/292 |
| 3,605,898 | 9/1971 | Harrison et al. | 166/293 |
| 3,635,289 | 1/1972 | Van Dyk | 166/295 |
| 3,750,768 | 8/1973 | Suman, Jr. et al. | 166/295 |
| 3,830,298 | 8/1974 | Knight et al. | 166/295 |
| 3,872,923 | 3/1975 | Knight et al. | 166/295 |
| 3,877,522 | 4/1975 | Knight et al. | 166/295 |
| 3,887,009 | 6/1975 | Miller et al. | 166/292 |
| 3,954,629 | 5/1976 | Scheffel et al. | 166/295 |
| 3,973,629 | 8/1976 | Knight et al. | 166/295 |
| 4,036,301 | 7/1977 | Powers et al. | 166/295 |

FOREIGN PATENT DOCUMENTS

| 747719 | 12/1966 | Canada | 166/295 |
|---|---|---|---|
| 825988 | 10/1969 | Canada | 166/295 |
| 48007 | 7/1980 | U.S.S.R. | 166/295 |

*Primary Examiner*—Stephen J. Novosad
*Assistant Examiner*—William P. Neuder
*Attorney, Agent, or Firm*—J. M. Hoster; E. T. Wheelock

[57] ABSTRACT

This application discloses a process for drilling and primary cementing a well using a drilling fluid containing a polymeric material which may be converted into a well cement by contact with an initiator and, optionally, by irradiation with a suitable radioactive source.

31 Claims, 5 Drawing Sheets

METHOD FOR PRIMARY CEMENTING A WELL WITH A DRILLING MUD WHICH MAY BE CONVERTED TO CEMENT USING CHEMICAL INITIATORS WITH OR WITHOUT ADDITIONAL IRRADIATION

RELATED APPLICATIONS

This application is related to the following applications filed the same date as is this one:

"Primary Cementing Technique" by Novak P.M. Ser. No. 463,200—2/2/83.

"A Settable Drilling Fluid" by Novak P.M. Ser. No. 462,838—2/2/83.

"Novel Drilling Mud Composition" by Novak and Talukder P.M. Ser. No. 462,833—2/2/83.

"Alkadiene - Acrylic . Vinyl Compound Copolymers" by Novak, Talukder, and Sinclair P.M. Ser. No. 463,199—2/2/83.

BACKGROUND OF THE INVENTION

1. Object of the Invention

This invention relates to a method of primary cementing a well with a drilling mud containing a polymeric compound which may be converted to a cement with chemical initiators either with or without additional irradiation.

2. Field of the Invention

The process of searching for oil and gas is fraught with risk. Approximately three out of every four wells drilled in the United States are dry holes. Even in the instance when a well is found to have penetrated a subterranean formation capable of producing an economic amount of hydrocarbon, the well must be carefully completed after drilling has ended or less than the maximum amount of hydrocarbon will be produced. One problem caused by the improper well completion step of cementing is subterranean movement of gas from a high pressure formation to another formation of lower pressure. The gas lost in this way may never be recovered. This invention solves many of the problems associated with poor cementing procedures by converting the fluid known as "drilling mud" directly into a hardened cement. Drilling mud is the fluid typically used during the drilling of a well to lubricate and cool the bit as well as remove rock cuttings from the borehole. Drilling mud is usually displaced in a discrete step by a cement slurry after the borehole is lined with steel casing.

The process of drilling a well followed by the steps of casing and cementing it are described below.

a. Drilling the Well

In conventional rotary drilling, a borehole is advanced down from the surface of the earth (or bottom of the sea) by rotating a drill string having a drill bit at its lower end. Sections of hollow drill pipe, usually about 30 feet long, are added to the top of the drill string, one at a time, as the borehole is advanced in increments.

In its path downward, the drill bit may pass through a number of strata before the well reaches the desired depth. Each of these subsurface strata has associated with it physical Parameters, e.g., fluid content, hardness, porosity, pressure, inclination, etc., which make the drilling process a constant challenge. Drilling through a stratum produces significant amounts of rubble and frictional heat; each of which must be removed if efficient drilling is to be maintained. In typical rotary drilling operations, heat and rock chips are removed by the use of a liquid known as drilling mud. As noted above, drill strings are usually made up of sections of hollow pipe terminated by a drill bit. Drilling mud is circulated down through the drill string, out through orifices in the drill bit where the mud picks up rock chips and heat, and returns up the annular space between the drill string and the borehole wall to the surface. The mud is sieved on the surface, reconstituted, and pumped back down the drill string.

Drilling mud may be as simple in composition as clear water, but more likely it is a complicated mixture of clays, thickeners, and weighting agents. The characteristics of the drilled geologic strata and, to some extent, the nature of the drilling apparatus determine the physical parameters of the drilling fluid. For instance, the drilling mud must be capable of carrying the rock chips to the surface from the drilling site. Shale-like rocks often produce chips which are flat. Sandstones are not quite so likely to produce a flat chip. The drilling fluid must be capable of removing either type of chip. Conversely, the mud must have a viscosity which will permit it to be circulated at high rates without excessive mud pump pressures.

In the instance where a high pressure layer, e.g., a gas formation, is penetrated, the density of the drilling mud must be increased to the point such that the hydrostatic or hydraulic head of the mud is greater than the downhole (or "formation") pressure. This prevents gas leakage out into the annular space surrounding the drill pipe and lowers the chances for the phenomenon known as "blowout" in which the drilling mud is blown from the well by the formation gas. Finely ground barite (barium sulfate) is the additive most widely used to increase the specific gravity of drilling mud; although, in special circumstances, iron ore, lead sulfide, ferrous oxide, or titanium dioxide may also be added.

In strata which are very porous or are naturally fractured and which have formation pressures comparatively lower than the local pressure of the drilling mud, another problem occurs. The drilling fluid, because of its higher hydrostatic head, will migrate out into the porous layer rather than completing its circuit to the surface. This phenomenon is known as "lost circulation". A common solution to this problem is to add a lost circulation additive such as gilsonite.

Fluid loss control additives may be included such as one containing either bentonite clay (which in turn contains sodium montmorillonite) or attapulgite, commonly known as salt gel. If these clays are added to the drilling mud in a proper manner, they will circulate down through the drill string, out the drill bit nozzles, and to the site on the borehole wall where liquid from the mud is migrating into the porous formation. Once there, the clays, which are microscopically plate-like in form, form a filter cake on the borehole wall. Polymeric fluid control additives are also well known. As long as the filter cake is intact, very little liquid will be lost into the formation.

The properties required in drilling mud constantly vary as the borehole progresses downward into the earth. In addition to the various materials already noted, such substances as tannin-containing compounds (to decrease the mud's viscosity), walnut shells (to increase the lubricity of the mud between the drillstring and the borehole wall), colloidal dispersions, e.g., starch, gums, carboxy-methyl-cellulose (to decrease the tendency of the mud to form excessively thick filter cakes on the wall of the borehole), and caustic soda to adjust the pH of the mud) are added as the need arises.

The fluid used as drilling mud is a complicated mixture tailored to do a number of highly specific jobs.

Once the hole is drilled to the desired depth the well must be prepared for production. The drill string is removed from the borehole and the process of casing and cementing begins.

b. Casing and Cementing the Well

It should be apparent that a well that is several thousand feet long may pass though several different hydrocarbon producing formations as well as a number of water producing formations. The borehole may penetrate sandy or other unstable strata. It is important that in the completion of a well each producing formation be isolated from each of the others as well as from fresh water formations and the surface. Proper completion of the well should stabilize the borehole for a long time. Zonal isolation and borehole stabilization are also necessary in other types of wells, e.g., storage wells, injection wells, geothermal wells, and water wells. This is typically done, no matter what the type of well, by installing metallic tubulars in the wellbore. These tubulars known as "casing", are often joined by threaded connections and cemented in place.

The process for cementing the casing in the wellbore is known as "primary cementing". In an oil or gas well, installation of casing begins after the drill string is "tripped" out of the well. The wellbore will still be filled with drilling mud. Assembly of the casing is begun by inserting a single piece of casing into the borehole until only a few feet remain above the surface. Another piece of casing is screwed onto the piece projecting from the hole and the resulting assembly is lowered into the hole until only a few feet remain above the surface. The process is repeated until the well is sufficiently filled with casing.

A movable plug, often having compliant wipers on its exterior, is then inserted into the top of the casing and a cement slurry is pumped into the casing behind the plug. The starting point for a number of well cements used in such a slurry is the very same composition first patented by Joseph Aspdin, a builder from Leeds, England, in 1824. That cement, commonly called Portland cement is generally made up of:

50% Tricalcium silicate
25% Dicalcium silicate
10% Tricalcium aluminate
10% Tetracalcium aluminoferrite
5% Other oxides.

API Class A, B, C, G and H cements are all examples of Portland cements used in well applications. Neat cements may be used in certain circumstances; however, if special physical parameters are required, additives may be included to the cement slurry.

As the cement is pumped in, the drilling fluid is displaced up the annular space between the casing and the borehole wall and out at the surface. When the movable plug reaches a point at or near the bottom of the casing, it is then ruptured and cement pumped through the plug into the annular space between the casing of the borehole wall. Additional cement slurry is pumped into the casing with the intent that it displace the drilling mud in the annular space. When the cement cures, each producing formation should be permanently isolated thereby preventing fluid communication from one formation to another. The cemented casing may then be selectively perforated to produce fluids from particular strata.

However, the displacement of mud by the cement slurry from the annular space is rarely complete. This is true for a number of reasons. The first may be intuitively apparent. The borehole wall is not smooth but instead has many crevices and notches. Drilling mud will remain in those indentations as the cement slurry passes by. Furthermore, as noted above, clays may be added to the drilling mud to form filter cakes on porous formations. The fact that a cement slurry flows by the filter cake does not assure that the filter cake will be displaced by the slurry. The differential pressure existing between the borehole fluid and the formation will tend to keep the cake in place. Finally, because of the compositions of both the drilling mud and the cement slurry, the existence of non-Newtonian flow is to be expected. The drilling mud may additionally possess thixotropic properties, i.e., its gel strength increases when allowed to stand quietly and the gel strength then decreases when agitated. The combination of these effects creates boundary layer conditions which hinder the complete displacement of the drilling mud from the annular space.

Several remedial and preventative steps may be taken to assist in removal of drilling mud from the annular space. Long wire bristles or "scratchers" may be placed at intervals along the casing string as it is inserted into the hole. These devices have the direct beneficial effect of removing filter cakes from the borehole wall and providing an improved bonding site for the set cement. However, because of the flow characteristics of the cement slurry and the drilling mud, the scratchers are not completely effective in causing the mud to displace.

Similarly, a device known as a "centralizer" can be added to the casing string to centralize the casing and improve the flow around the string. Although centralizers are helpful in preventing quiescent areas, the borehole does not have a perfect interior surface and dead spots will occur in, e.g., dog-legs in the hole.

Other methods of aiding in the displacement operation, have been attempted and each has its own benefits and detriments. These methods include preflushes, spacers, additives to reduce drilling mud viscosity, abrasive materials to erode the filter cake, and high apparent viscosity cement to displace drilling mud in a piston-like motion. None of the known methods is completely effective in removing mud from the borehole wall.

One goal of the art has been to dispense with the necessity of displacing the drilling mud by utilizing but a single fluid capable of performing the functions of both the mud and the cement. The benefits of such a multifunctional fluid are apparent. The requirements that the filter cake be removed from the borehole wall and that the mud be taken from the imperfections in the wall are therefore obviated. A few patents disclose methods for converting drilling mud to cement and are discussed below. However, none of these disclosures suggest a drilling mud which is used per se as the well cement. None of the references shows the conversion of mud to cement by irradiation in the well.

A method of converting drilling mud to a cement slurry is disclosed in U.S. Pat. No. 3,168,139, issued to Kennedy et al on Feb. 2, 1965. Kennedy et al teaches the straightforward step of adding a hydraulic cement, preferably a Portland cement, to the drilling mud to form a cement slurry. Kennedy et al does not suggest using the cement slurry so-formed as a drilling fluid. Kennedy et al also notes at Column 13, line 32 et seq that "less channeling through the set cement occurs than when conventional cementing slurries are employed". The efficiency of the Kennedy et al process is therefore not assured.

The patent to Cunningham et al, U.S. Pat. No. 3,409,093, issued Nov. 5, 1968, teaches the use of a known cement slurry as the drilling fluid. This process is said simultaneously to produce an impenetrable filter cake on the borehole wall and a strong cement sheath on the walls capable of stabilizing the borehole wall. It should be apparent that close control of setting rate by retarder concentration and water content (via inclusion of water and water-loss additives) must be maintained using this process lest the cement slurry set and seize the drill string. It should also be apparent that the drilling fluid disclosed by Cunningham et al will be useful as a drilling fluid only for a short time.

Tragesser, U.S. Pat. No. 3,557,876, issued Jan. 26, 1971, teaches a drilling mud which can be converted, when desired, to a cementitious material by the addition of an alkaline earth oxide such as calcium, strontium or barium oxide. The particular drilling mud involved comprises water, collodial clay, various conventional additives, and a substance known as pozzolan. Pozzolan is a siliceous material (generally about 50 percent silicon oxide) containing various percentages of other oxides such as magnesium oxide, aluminum oxide, or iron oxide. These materials are said to form a cementitious material when reacted with an alkaline earth oxide in the presence of water at the temperatures found downhole in a well. There is no assurance that adequate mixing between the disclosed drilling mud and the alkaline earth oxide will occur in the well. Without proper mixing, quiescent volumes may remain within the well and prevent attainment of an acceptable cement job.

The disclosure in Harrison et al. U.S. Pat. No. 3,605,898 issued Sept. 20, 1971, relates to a hydraulic cement composition containing a setting retardant known as a heptolactone, preferably D-gluco-D-guloheptolactone. The composition is said to be usable as a drilling mud as long as the retardent is effective. A water soluble polyvalent metal salt, preferably $CaCl_2$, is added to the mud to effect a conversion into cement.

The teachings in Miller et al, U.S. Pat. No. 3,887,009, issued June 3, 1975, relate to a clay-free magnesium-salt drilling fluid. Such fluids are said to typically contain 15 to 60 pounds of magnesium sulfate per barrel of drilling mud, from 20 to 70 pounds per barrel dolomite, about 3 to 15 pounds of calcium oxide per barrel, and 4 to 10 pounds of gypsum per barrel. In order to form a cement from this drilling mud, sufficient magnesium oxide, magnesium sulfate and dolomite or magnesium carbonate are added to produce a magnesium oxysulfate cement. Again, control of the concentration of the added material appears to be critical.

None of the disclosures of Tragesser, Harrison et al or Miller et al eliminate the step of displacing the drilling fluid from the well.

The inventive process disclosed herein requires the addition of a chemical initiator to the disclosed drilling mud prior to the time for cementing. The mud may be circulated to mix the mud in the well. The mud may then, if desired, be irradiated. The cross-linkable polymers contained In the drilling mud thereafter crosslink forming a strong set cement.

There are, of course, other known compositions containing polymerizable compounds which have been placed in wells for a variety of reasons.

A disclosure of one such composition is found in Perry et al, U.S. Pat. No. 3,114,419 issued Dec. 17, 1963. Perry et al suggests a "method for polymerizing liquid-resin forming materials suitable for use in well bores penetrating permeable subterranean formations". The preferred method uses radiation to copolymerize an alkylidene bisacrylamide with an ethylenic monomer. Perry et al teaches that the polymeric composition is made up so as to have a specific gravity between 1.07 and 1.18 (Column 4, lines 48 et seq). The specific gravity may be adjusted by the addition of non-ionizing organic weighting agents such as sugar or glycerol. The composition should retain some water solubility to be effective (Column 3, lines 43 et seq). The composition is pumped to the formation to be plugged by first pumping fresh water down the casing followed by the polymeric composition (Column 5, line 65 et seq). An amount of salt water is then pumped in until the composition is placed at the site of the porous formation. Because the specific gravity of the composition is between that of the overlying fresh water and the underlying salt water, it will stay in place. A radioactive source is then inserted into the well, to effect copolymerization and seal the permeable formation. Perry et al additionally discloses the use of similar processes to seal permeable formations when using a gas as the drilling fluid (Column 6, line 46 et seq and Example V) and to plug a permeable formation in a water flood injection well (Example VI).

Other disclosures relating to the use of irradiated polymers in well liquids can be found in U.S. Pat. Nos. 3,830,298, 3,872,923, 3,877,522, and 3,972,629 each issued to Knight et al. Another disclosure of radiation induced polymerization may be found in Canadian Pat. No. 1,063,336 to Ressaine et al. Each of these disclosures relates to a particular use of a polymerized "acrylamide and/or methacrylamide and acrylic acid, methacrylic acid, and/or alkali metal salts thereof" in a number of different ways, e.g., as a water loss additive in cement, as a plugging medium in a porous formation, etc. However, each of the disclosures deals with a polymeric composition which is irradiated prior to being placed in a well.

U.S. Pat. No. 3,635,289, to Van Dyk, discloses a process for sealing a cavity in the earth by using a water-in-oil emulsion having a continuous oil phase having therein an unsaturated polyester and a solvent of a polymerizable compound and a discontinuous water phase containing a catalyst. The catalyst is prevented from polymerizing the emulsion for various lengths of time by the addition of specific amounts of inhibitor. Van Dyk does not disclose the use of the emulsion as a drilling fluid.

U.S. Pat. No. 3,199,589, to Boyd et al, discloses a process of polymerizing a composition containing a monomeric alkylidene bisacrylamide and a copolymerizable monomer with an oxidizing catalyst in a well by triggering the reaction with a composition of ascorbic acid and a water-soluble ferrous compound. The composition becomes solid shortly after introduction of that triggering compound. Boyd et al does not disclose use of the composition as a drilling fluid.

c. Completing the Well

After the casing is cemented in place, a well is prepared for hydrocarbon production using a number of separate steps. A perforation tool is commonly lowered within the cemented casing to the region of a producing formation. The perforation tool is a device which often is constructed of a number of guns which produce holes through the casing and its enclosing cement and into the producing formation. The interior of the casing is thereafter in open communication with the formation.

Other completion steps may involve fracturing to increase well productivity, installing screens to exclude sand from the well bore, and installing production tubing between the producing formation and the surface.

SUMMARY OF THE INVENTION

This invention relates to a method of primary cementing a well with a drilling fluid containing a polymerizable material and which may be hardened to a cement using a chemical initiator with or without additional doses of radiation.

BRIEF DESCRIPTION OF THE DRAWINGS

FIGS. 2A and 2D illustrate the various steps involved in a typical production casing primary cementing job.

FIGS. 3A through 3D illustrate the various steps involved in the primary cementing of production casing using the disclosed inventions.

DETAILED DESCRIPTION OF THE PREFERRED EMBODIMENTS

Figure 1:
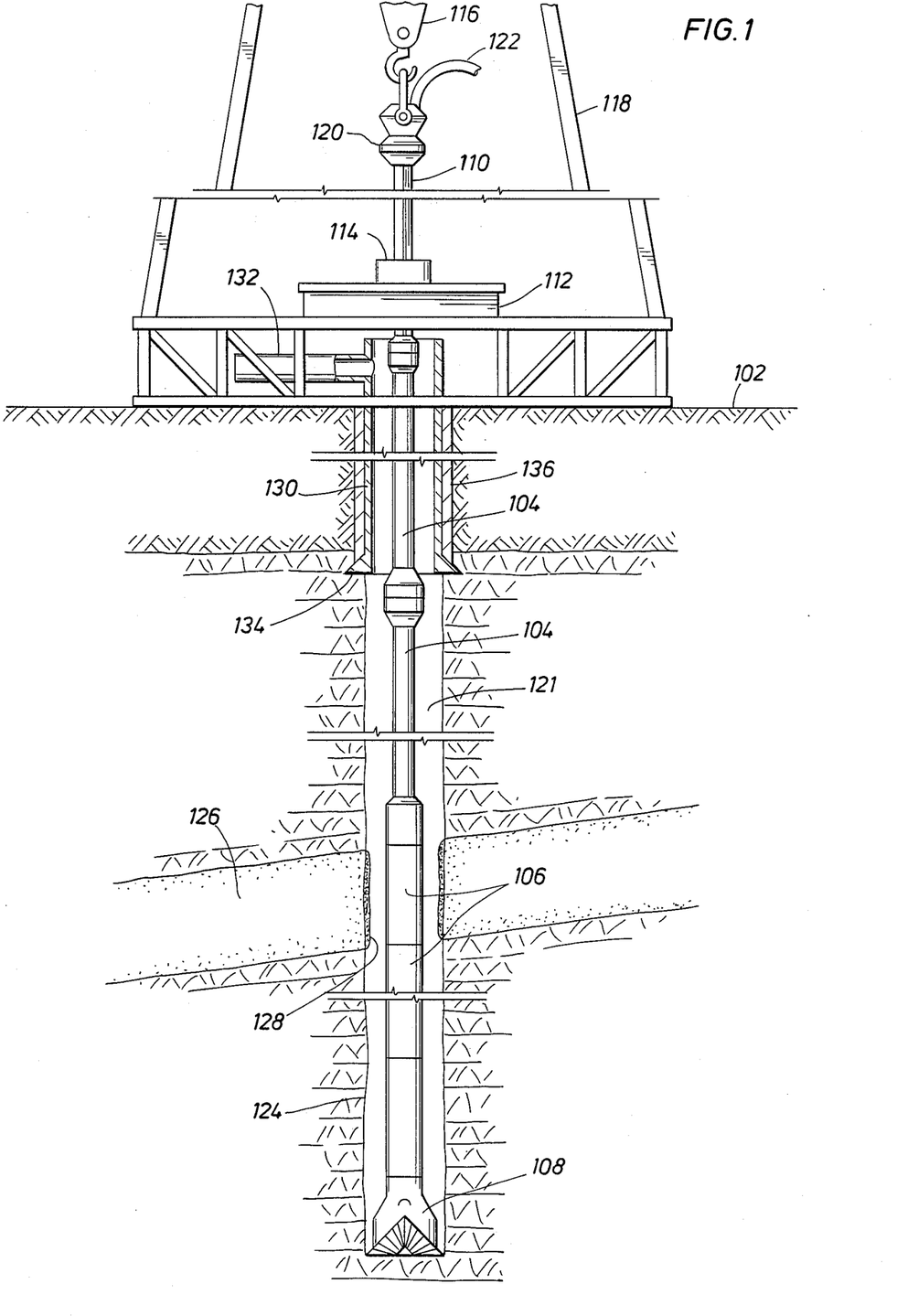
FIG. 1 depicts a cross-sectional elevational of a typical rotary rig used in drilling oil and gas wells.

As discussed above, the process of drilling a well using rotary drilling apparatus is a complicated and often lengthy process. A conventional drilling rig is shown in FIG. 1. The moving portion below ground level 102 consists of a drill string and is made up of drill pipe sections 104, drill collars 106, and a drill bit 108. The drill pipe sections 104 and drill collars 106 are little more than strong threaded hollow pipe sections which are rotated by equipment on the surface. Drilling collars 106 have very thick walls and consequently are much heavier than similar sections of drill pipe. The drill collars 106 are intended to provide a relatively constant weight on drill bit 108, steady the drill string and keep it in tension.

The drill string is turned by a kelly 110, a flatsided hollow pipe, usually square or hexagonal in cross section, which is screwed into the uppermost section of drill pipe 104. The kelly is turned by a powered rotary table 112 through a kelly bushing 114. The kelly bushing 114 fits between the kelly 110 and the rotary table 112. It will slide up the kelly and out of engagement with the rotary table 112. The rotary table 112 has a hole through its middle of sufficient size to allow passage of the drill pipe 104, drill collars 106, and the drill bit 108. That hole has a shape often square which will mesh with the kelly bushing 114. The drill string and kelly 110 are supported by rig hoisting equipment including a traveling block 116 supported in the derrick 118. The drill string rotates on swivel 120.

While the drill string is turning, dilling mud 121 is pumped into the swivel 120 from high pressure mud pumps (not shown) via a hose 122. The drilling mud proceeds down through the kelly 110, drill pipe sections 104, drill pipe collars 106, and exits through nozzles in drill bit 108. The mud 121 then flows upwardly through the annular space between the borehole wall 124 and either the drill collars 106 or drill pipe sections 104.

For purposes of illustration, the depicted well has a formation 126 with a formation pressure lower than the hydrostatic head of the drilling mud. The drilling mud is one having a clay such as bentonite dispersed therein. Because of the difference in pressure between the annular space and the formation 126, a filter cake 128 of clay has been formed on the borehole wall.

In any event, the drilling mud 121 proceeds upwardly along the formation 126, past the surface casing 130 and out a pipe 132 for subsequent separation from the produced rock chips, reconstitution and recycling to the well. The surface casing 130 is a casing similar to the production casings which will be discussed below. In most states the law requires that the surface casing extend from the surface to some stated depth, often 2000 feet. The surface casing isolates shallow aquifers from the well. It is set by a casing foot 134 and held in place by cement 136. It is often easier to produce an acceptable surface casing cement job since few hydrocarbon formations are located near the surface to pollute lowlying aquifers.

For simplicity of explanation, the apparatus associated with reconstituting the drilling mud is not depicted in the Figures nor explained in this specification. The apparatus is well known. Similarly, certain safety equipment of almost universal usage in the petroleum industry, e.g., the blowout preventer stack, have been omitted from the discussion here for the purpose of simplifying the overall explanation of the known drilling process.

Once the well is drilled to the desired depth, the drill string is withdrawn from the borehole and the process of casing the well begins.

As discussed above, the primary purpose ior installing cemented casings in a wellbore is to isolate each of the formations from all other formations penetrated by the well. Well casings are of two principal types, surface casing and production casing. Several different sizes of casing may be used in some wells. Surface casing illustrated by 130 in FIG. 1, is the first casing installed in a wellbore and extends from the ground surface downwardly for a some set distance. Production casing is typically installed downhole adjacent the hydrocarbon formations to be produced. The outside diameter of the production casing must be smaller than the inside diameter of the surface casing so that the production casing can be inserted into the wellbore through the surface casing. Typically, both surface and production casing are cemented in place.

Figure 2A:
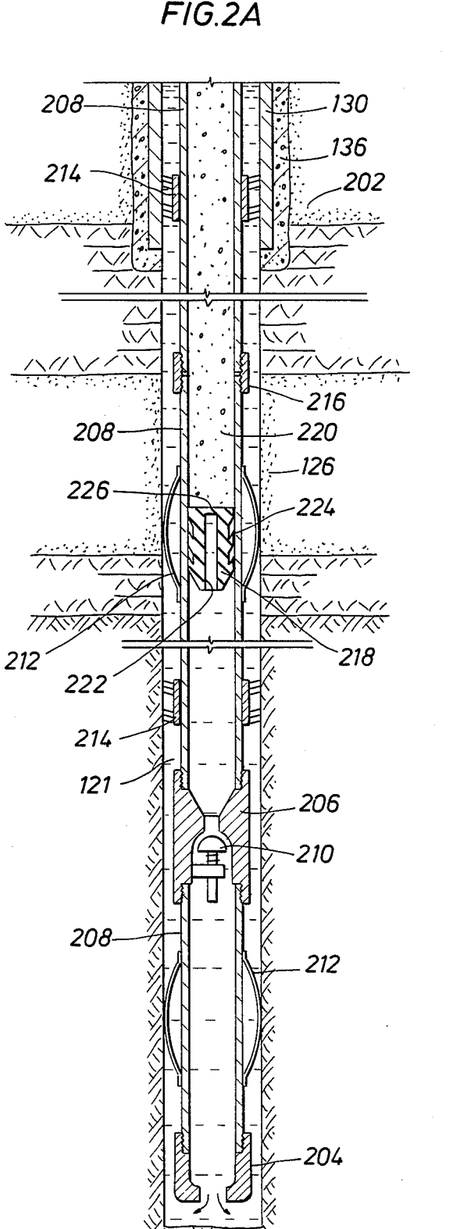
FIG 2A is a cross-sectional elevation view showing the first step in the displacement procedure.

FIGS. 2A through 2D illustrate the various steps in a typical production casing primary cementing job after the casing is set in place. This process is equally applicable to the cementing of surface casings or other casings. In FIG. 2A, the wellbore passes down from the surface through various subterranean formations including a fresh water aquifer 202 and a producing formation 126.

As noted above, the well will typically have a surface casing 130 which is held in place by a cement sheath 136. The cement sheath 136 may be formed by the same process as described below.

The production casing string found in FIG. 2A is made up of a casing shoe 204, float collar 206, and a number of joints of steel production casing 208. The purpose of the casing shoe 204 is to prevent distortion or abrasion of the production casing as it is forced past obstructions on the wall of the wellbore. Float collar 206 contains a back-pressure or check valve 210 which permits flow only in a downward direction. A number of casing centralizers 212 are attached at various points along the casing string in an attempt to maintain the string in the center of the wellbore. Similarly, scratchers 214 may be placed at intervals along the outside of the casing string. The scratchers 214 are used during the displacement process, in conjunction with rotation or reciprocation of the casing string, to dislodge gelled drilling mud or filter cake which may be adhering to the borehole wall. A small collar 216 is used to connect adjacent sections of production casing 208.

FIG. 2A illustrates the primary step in the process of displacing drilling mud with cement. Bottom plug 218 is inserted into the casing string and a cement slurry 220 is pumped in above it. Bottom plug 218 has a longitudinal hole 222 formed through its center, a number of wipers 224 formed circumferentially about its outer surface and a diaphragm 226 attached to its upper surface to temporarily prevent the flow of cement through the hole 222. As the cement slurry 220 is pumped into the casing string it pushes the bottom plug 218 down toward the float collar 206. The movement of the bottom plug 218 in turn forces drilling mud 121 to flow down the casing string, out the casing shoe 204, up the wellbore annulus, and out of the wellbore at the surface. Back-pressure valve 210 is held open by the flow of the drilling mud 121 through float collar 206.

Figure 2B:
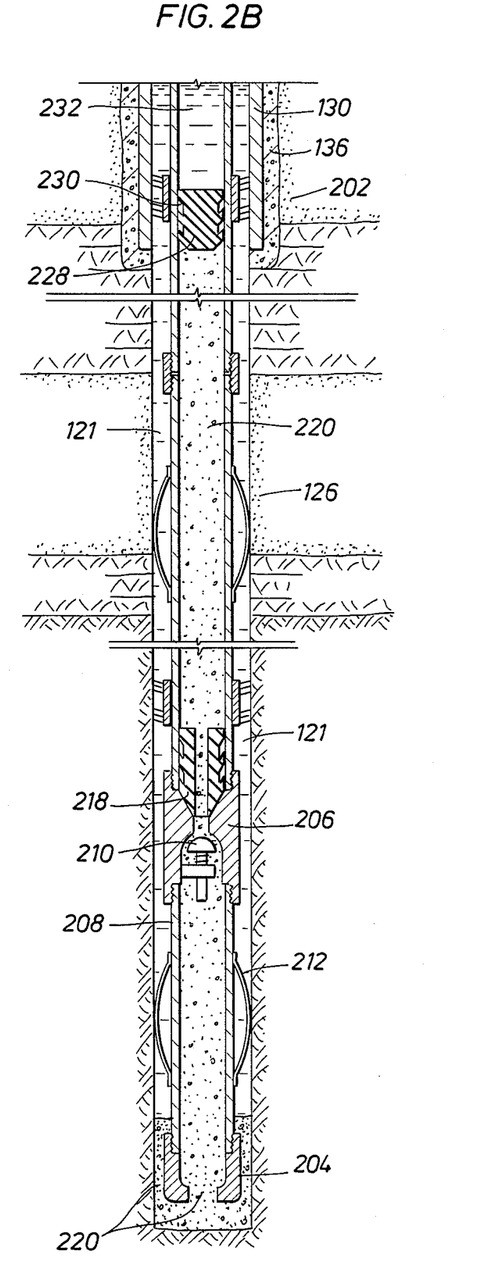
FIG. 2B is cross-sectional elevation view showing the second step in the displacement procedure.

The following step in the process is shown in FIG. 2B. Bottom plug 218 has been seated against the upper surface of float collar 206 and the diaphragm 226 broken. Cement slurry flows through the float collar 206, out of the casing shoe 204, and up the annulus. Back-pressure valve 210 is held open by the downward movement of cement slurry 220. When a selected amount of cement slurry 220 has been pumped into the casing string, a top plug 228 is inserted into the string. Top plug 228 has a number of circumferential wipers 230 on its exterior. A displacement fluid 232, e.g. water, is introduced behind the top plug 228 and pumped down.

Figure 2C:
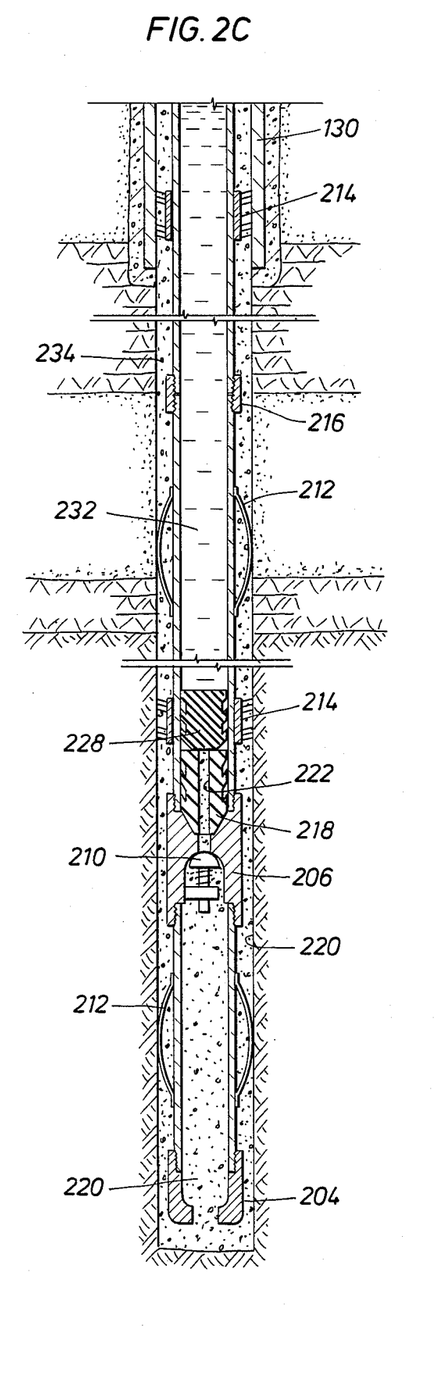
FIG. 2C is a cross-secional elevation view showing the final step in the displacement procedure.

FIG. 2C illustrates the last step in the displacement process. Top plug 228 has been forced down into contact with bottom plug 218 thereby closing the longitudinal hole 222 through the bottom plug 218. The addition and pumping of displacement fluid 232 is then terminated and pressure on the displacement fluid 232 is released. Back-pressure valve 210 in float collar 206 closes and thereby prevents cement slurry 220 from flowing back up the inside of the casing string. Without closure of the back pressure valve 210 the high hydrostatic head of the cement slurry 220 would tend to push the displacement fluid 232 back up the casing string. The cement slurry 220 may extend to the surface or it may have some drilling mud above it in the annulus. In any event, the cement slurry 220 is allowed to harden between the production casing and either the surface casing 130 or the borehole wall. Upon hardening, the casing string is firmly locked in place by the bond between the hardened cement sheath 234 and the casing string and by the various casing protuberances, e.g., casing shoe 204, centralizers 212, float collar 206, scratchers 214, and collars 216.

Figure 2D:
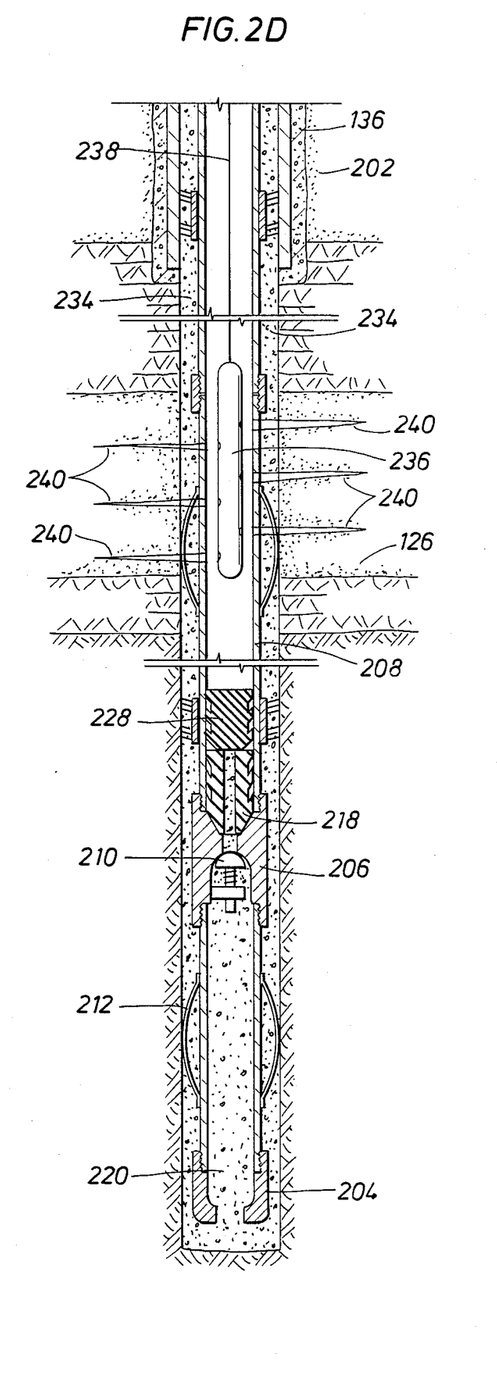
FIG. 2D is cross-sectional elevation view showing the perforations used to produce hydrocarbons after the casing has been cemented. The perforating tool is depicted in place hanging from a wireline.

The method used to produce hydrocarbon fluids from the well is shown in FIG. 2D. After the cement sheath 234 has sufficiently hardened, the production casing 208 and the cement sheath 234 is perforated using a perforating tool 236 on a wire line 238 within the producing formation 126. A perforating tool 236 typically fires into the producing formation 126 upon a command sent over a wireline 238. This step creates a number of perforations 240 through which hydrocarbon fluid may flow into the casing string and up to the surface. If the process and apparatus operate as designed, the hydrocarbon will flow only into the interior of the casing string and not to any other formation penetrated by the well.

As discussed above, one major problem in the creation of a fluid-tight cement sheath surrounding production casing and capable of isolating various subterranean fluid-containing lies in the inability of the cement slurry to effectively displace the drilling mud found in the borehole. The cement slurry does not always remove filter cake from those regions of the borehole where the formations absorb liquid. If a section of production casing resides near the borehole wall, there exists a significant possibility that a quiescent zone of gelled drilling mud will remain in the region where the production casing approaches the borehole wall. The cement slurry simply flows around this quiescent zone. Clearly, such anomalies create regions in which the cement is not capable of sealing the borehole wall.

The invention herein obviates these problems by the simple expedient of eliminating the displacement step. The process requires the presence of a drilling mud composition containing a polymerizable compound which may be polymerized by mixture with a chemical initiator and, optionally, by exposure to a suitable radiation source. Instead of attempting to displace the drilling mud from the well, the drilling mud is displaced only from the interior of the casing string and the mud remaining in the annulus is thereafter hardened.

The drilling mud composition may be made up of a conventional drilling mud and a polymerizable mixture.

Conventional drilling fluids, as discussed above, contain a number of diverse components; the proportion and type of each component is determined on the basis of need. The settable drilling mud disclosed herein may contain any of the components mentioned above as well as any other which may be known in the art. The inventive drilling mud desirably is a water-based mud and should have chemical, physical, and rheological properties comparable to conventional drilling muds. The mud should remain stable during and after the imposition of various forces during the drilling process. These may include shear forces encountered in the mud pump or at the drill bit nozzles and the high temperatures and pressures encountered within the wellbore. Organic polymers or monomers having internal double bonds may be used in the mud formulation to hinder adverse effects on the physical characteristics of the mud at higher temperatures.

The cementitious material which results from the use of the inventive drilling mud must share some of its physical properties with other cements known in the art. For instance, the cement must not have significant shrinkage after curing. The compressive strength of the cured cement must be sufficient for the well in which the cement is placed. Finally, the time needed to cure the cement should not be significantly different than those found in the art.

Compositions which have been found to possess the desired characteristics and may be solidified upon reaction with a suitable chemical initiator and, optionally, upon exposure to a radioactive source generally contain a polymer having one or more carbon-carbon double bonds and monomeric crosslinking agents having one or more carbon-carbon double bonds. Functional groups substituted on either the polymer or the crosslinking agent should be thermally stable at the use temperatures.

The polymer containing at least one carbon-carbon double bond may be one which is cross-linkable using a chemical initiator or, optionally, a radioactive source or may be one or more selected from the group consisting of: vinyl-, hydroxyl-, carboxyl-terminated butadiene acrylonitrile copolymers; methacrylic acid-methacrylate ester copolymers; polyethylene; polyacrylamide; polybutadiene; hydroxyl- or carboxyl-terminated polybutadiene; hydroxy-terminated epichlorohydrin polymers; polybutadiene oxide; polyvinyl alcohol; or polybutadiene acrylonitrile acrylic acid copolymer. The polymer may be present in the settable drilling mud composition in amounts from 5% to 50% by weight and, in any event, in an amount sufficient to form an acceptable cementitious material upon curing.

The monomeric crosslinking agents containing at least one double bond may be selected from materials which are capable of reacting with other polymers via chemical initiated reaction or radiation to produce an acceptable cement, acrylate-based monomers, or may be one or more selected from members of the group consisting of: ethylene glycol diacrylate, tetraethylene glycol diacrylate, neopentylglycol diacrylate, tetrapropylene glycol diacrylate, trimethylolpropane triacrylate, ethylene glycol dimenthacrylate, triethylene glycol dimethacrylate, tetraethylene glycol dimethacrylate, trimethylolpropane trimeihacrylate, dicyclopentenyl oxyethyl methacrylate, divinyl benzene, 1,6-hexandiol diacrylate, tripropylene glycol diacrylate, diethyleneglycol divinyl ether. The monomeric crosslinking agent is added in an amount, for instance, of about 15% to 70%, but in any event sufficient to produce an acceptable cementitious material upon curing.

The catalysts used herein may be free-radical generating catalysts or catalyst systems. The catalyst may be employed in total amounts from about 0.01 to about 50 weight percent based upon the weight of the polymerizable monomer. Such catalysts may be organic peroxycompounds such as benzoyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methylethyl ketone peroxide, dibutylperoxyl cyclohexane, di (2,4-dichlorobenzoyl) peroxide, diisobutyryl peroxide, t-butyl perbenzoate, and t-butyl peracetate.

Hydrogen peroxide and other inorganic peroxides and their derivatives are also suitable. Ammonium, potassium or sodium peroxydisulfates are especially desirable.

Azo compounds such as 2,2'-bisazoisobutyronitrile are also active.

Other catalysts include alkali metal, ammonium, and organic salts of peracids such as percarbonic acid (including isopropyl percarbonate), perphosphoric acid, sulfo-peracids, perboric acid, performic acid, peracetic acid and succinic acid peroxide.

Redox catalyst systems may be employed in this invention. For instance, each of hydrogen peroxide and inorganic peroxides and their derivatives and the salts of peracids mentioned above can be mixed with reducing agents such as sulfite, thiosulfite, bisulfite salts (particularly ammonium or alkali metal salts); amines such as dimethyl-p-toluidine, dimethylaniline, dieihanolamine, and triethylene tetramine; acetic acid with or without a metal ion (such as ferrous ion); or a metallic ion-containing compound. The organic peroxy compounds discussed above may be mixed with amines such as dimethyl-p-toluidine or dimethylaniline to form organic redox systems.

The preferred catalyst system is benzoyl peroxide promoted by dimethyl-p-toluidine.

Table I below lists a series of compositions made using the following procedure to demonstrate the attainable compressive strengths of settable drilling fluids made using radiation curing. Similar compositions may be cured using chemical initiators.

A slurry for the compositions in Table I was made by mixing, while stirring, 30 parts by weight of bentonite into 339 parts by weight tap water. The resulting mixture was stirred for 30 minutes. Two parts by weight of chrome lignosulfonate (tradename—SPERSENE) was added and the mixture stirred for five minutes. Sodium hydroxide, in an amount of 0.6 to 0.7 parts by weight, was added.

The bentonite-chrome lignosulfonate slurry was then mixed with the polymers and cross-linking agents listed in Table I to produce a polymer slurry. The Fann rheology characteristics of the slurry were measured at 300 rpm and 600 rpm. Samples were then irradiated with a Co-60 source at the noted rates and total dose to produce cured solids. The resulting compressive strengths of specimens having about 0.8 square inch cross section and a height of about 0.5 inch were then measured.

TABLE I

| Sample | Base Polymer (g.) | Add'l Polymer (g.) | Cross-Linking Agent (g.) | Bentonite Cr—lignosulfonate Slurry (g.) | Fann Viscosity 300 rpm | Fann Viscosity 600 rpm | Dose Rate (MR/hr) | Dose (MR) | Compressive Strength (psi.) |
|---|---|---|---|---|---|---|---|---|---|
| I-1 | VTBN (40) | E-1194 (8) | TMPTMA (148) | (200) | High | — | 1.0 | 0.5 | 670.2 |
| I-2 | VTBN (40) | E-1194 (8) | TMPTMA (148) | " | " | — | " | 1.0 | 1280.8 |

TABLE I-continued

| Sample | Base Polymer (g.) | Add'l Polymer (g.) | Cross-Linking Agent (g.) | Bentonite Cr—lignosulfonate Slurry (g.) | Fann Viscosity 300 rpm | Fann Viscosity 600 rpm | Dose Rate (MR/hr) | Dose (MR) | Compressive Strength (psi.) |
|---|---|---|---|---|---|---|---|---|---|
| I-3 | VTBN (40) | E-1194 (8) | TMPTMA (148) | " | " | — | " | 2.0 | 1767.0 |
| I-4 | VTBN (40) | E-1194 (8) | TMPTMA (148) | " | " | — | 2.0 | 0.5 | 466.5 |
| I-5 | VTBN (40) | E-1194 (8) | TMPTMA (148) | " | " | — | " | 1.0 | 1412.9 |
| I-6 | VTBN (40) | E-1194 (8) | TMPTMA (148) | " | " | — | " | 2.0 | 1575.5 |
| I-7 | VTBN (40) | E-1194 (8) | TMPTA (644) | " | 117 | 235 | 1.0 | 0.5 | 4594.3 |
| I-8 | VTBN (40) | E-1194 (8) | TMPTA (644) | " | " | " | " | 1.0 | 6780.8 |
| I-9 | VTBN (40) | E-1194 (8) | TMPTA (644) | " | " | " | " | 2.0 | 7440.2 |
| I-10 | VTBN (40) | E-1194 (8) | TMPTA (644) | " | " | " | 2.0 | 0.5 | 2358.6 |
| I-11 | VTBN (40) | E-1194 (8) | TMPTA (644) | " | " | " | " | 1.0 | 4662.0 |
| I-12 | VTBN (40) | E-1194 (8) | TMPTA (644) | " | " | " | " | 2.0 | 6062.3 |
| I-13 | VTBN (40) | E-1194 (8) | TMPTA (144) QM657 (496) | " | 104 | 220 | 1.0 | 0.5 | 7397.1 |
| I-14 | VTBN (40) | E-1194 (8) | TMPTA (144) QM657 (496) | " | " | " | " | 1.0 | 6681.3 |
| I-15 | VTBN (40) | E-1194 (8) | TMPTA (144) QM657 (496) | " | " | " | " | 2.0 | 8626.5 |
| I-16 | VTBN (40) | E-1194 (8) | TMPTA (144) QM657 (496) | " | " | " | " | 2.0 | 0.5 | 2751.2 |
| I-17 | VTBN (40) | E-1194 (8) | TMPTA (144) QM657 (496) | " | " | " | " | 1.0 | 8542.1 |
| I-18 | VTBN (40) | E-1194 (8) | TMPTA (144) QM657 (496) | " | " | " | " | 2.0 | 9633.5 |

NOTES:
VTBN vinyl-terminated butadiene acrylonitrile copolymer-B. F. Goodrich HYCAR VTBN
E-1194 methacrylic acid-methacrylate ester copolymer-Rohm and Haas
TMPTMA trimethylolpropane trimethacrylate
QM657 dicyclopentenyl oxyethyl methacrylate Additional settable drilling fluids were mixed using the base polymers, additional polymers and cross-linking agents listed in Table II by using the procedure outlined above with respect to Table I. The resulting polymer-containing slurries were irradiated at the noted rates and the compressive strengths measured.

TABLE II

| Sample | Base Polymer (g.) | Add'l Polymer (g.) | Cross-Linking Agent (g.) | Bentonite Ferrochrome Lignosulfonate Slurry (g.) | Dose Rate (MR/hr) | Dose (MR) | Compressive Strength (psi.) |
|---|---|---|---|---|---|---|---|
| II-1 | PE (74) | E-1194 (4) VTBN (65.2) | TMPTMA (148) | (100) | 1.0 | 1.0 | 3442 |
| II-2 | PE (74) | E-1194 (4) VTBN (65.2) | TMPTMA (148) | " | " | 5.0 | 4494 |
| II-3 | PE (74) | E-1194 (4) VTBN (65.2) | TMPTMA (148) | " | " | 10.0 | 5086 |
| II-4 | PE (74) | E-1194 (4) VTBN (65.2) | TMPTMA (148) | " | 2.0 | 1.0 | 3099 |
| II-5 | PE (74) | E-1194 (4) | TMPTMA (148) | " | " | 5.0 | 4959 |

TABLE II-continued

| Sample | Base Polymer (g.) | Add'l Polymer (g.) | Cross-Linking Agent (g.) | Bentonite Ferrochrome Lignosulfonate Slurry (g.) | Dose Rate (MR/hr) | Dose (MR) | Compressive Strength (psi.) |
|---|---|---|---|---|---|---|---|
| II-6 | PE (74) | VTBN (65.2) E-1194 (4) | TMPTMA (148) | " | " | 10.0 | 6345 |
| II-7 | P-35 (74) | VTBN (65.2) E-1194 (4) | TMPTMA (148) | " | 1.0 | 1.0 | 4876 |
| II-8 | P-35 (74) | VTBN (65.2) E-1194 (4) | TMPTMA (148) | " | " | 5.0 | — |
| II-9 | P-35 (74) | VTBN (65.2) E-1194 (4) | TMPTMA (148) | " | " | 10.0 | 5004 |
| II-10 | P-35 (74) | VTBN (65.2) E-1194 (4) | TMPTMA (148) | " | 2.0 | 1.0 | 2904 |
| II-11 | P-35 (74) | VTBN (65.2) E-1194 (4) | TMPTMA (148) | " | " | 5.0 | 4292 |
| II-12 | P-35 (74) | VTBN (65.2) E-1194 (4) | TMPTMA (148) | " | " | 10.0 | 3882 |
| II-13 | HTBN (47) | E-1194 (4) | TMPTMA (148) | " | 1.0 | 1.0 | 1014 |
| II-14 | HTBN (47) | E-1194 (4) | TMPTMA (148) | " | " | 5.0 | 1508 |
| II-15 | HTBN (47) | E-1194 (4) | TMPTMA (148) | " | " | 10.0 | 2175 |
| II-16 | HTBN (47) | E-1194 (4) | TMPTMA (148) | " | 2.0 | 1.0 | — |
| II-17 | HTBN (47) | E-1194 (4) | TMPTMA (148) | " | " | 5.0 | 899 |
| II-18 | HTBN (47) | E-1194 (4) | TMPTMA (148) | " | " | 10.0 | 1470 |
| II-19 | CTBN (75) | E-1194 (4) | TMPTMA (148) | " | 1.0 | 1.0 | 661 |
| II-20 | CTBN (75) | E-1194 (4) | TMPTMA (148) | " | " | 5.0 | 991 |
| II-21 | CTBN (75) | E-1194 (4) | TMPTMA (148) | " | " | 10.0 | 1469 |
| II-22 | CTBN (75) | E-1194 (4) | TMPTMA (148) | " | 2.0 | 1.0 | — |
| II-23 | CTBN (75) | E-1194 (4) | TMPTMA (148) | " | " | 5.0 | 2806 |
| II-24 | CTBN (75) | E-1194 (4) | TMPTMA (148) | " | " | 10.0 | 1401 |
| II-25 | RICON153 (74) | E-1194 (4) | TMPTMA (148) | " | 1.0 | 1.0 | — |
| II-26 | RICON153 (74) | E-1194 (4) | TMPTMA (148) | " | " | 5.0 | 678 |
| II-27 | RICON153 (74) | E-1194 (4) | TMPTMA (148) | " | " | 10.0 | 1179 |
| II-28 | RICON153 (74) | E-1194 (4) | TMPTMA (148) | " | 2.0 | 1.0 | 1647 |
| II-29 | RICON153 (74) | E-1194 (4) | TMPTMA (148) | " | " | 5.0 | 2581 |
| II-30 | RICON153 (74) | E-1194 (4) | TMPTMA (148) | " | " | 10.0 | 2338 |
| II-31 | CTB (74) | E-1194 (4) | TMPTMA (148) | " | 1.0 | 1.0 | — |
| II-32 | CTB (74) | E-1194 (4) | TMPTMA (148) | " | " | 5.0 | — |
| II-33 | CTB (74) | E-1194 (4) | TMPTMA (148) | " | " | 10.0 | 743 |
| II-34 | CTB (74) | E-1194 (4) | TMPTMA (148) | " | 2.0 | 1.0 | 268 |
| II-35 | CTB (74) | E-1194 (4) | TMPTMA (148) | " | " | 5.0 | 490 |
| II-36 | CTB | E-1194 | TMPTMA | " | " | 10.0 | 647 |

TABLE II-continued

| Sample | Base Polymer (g.) | Add'l Polymer (g.) | Cross-Linking Agent (g.) | Bentonite Ferrochrome Lignosulfonate Slurry (g.) | Dose Rate (MR/hr) | Dose (MR) | Compressive Strength (psi.) |
|---|---|---|---|---|---|---|---|
|  | (74) | (4) | (148) |  |  |  |  |

NOTES:
PE polyethylene (3500 MW)-Allied Chemical
P-35 polyacrylamide-American Cyanamid
HTBN hydroxyl-terminated butadiene acrylonitrile copolymer-B. F. Goodrich HYCAR HTBN
CTBN carboxyl-terminated butadiene acrylonitrile copolymer-B. F. Goodrich HYCAR CTBN
VTBN vinyl-terminated butadiene acrylonitrile copolymer-B. F. Goodrich HYCAR VTBN
E-1194 methacrylic acid-methacrylate ester copolymer-Rohm and Haas
TMPTMA trimethylolpropane trimethacrylate
RICON153 polybutadiene-Colorado Chemical Specialities, Inc.
CTB carboxyl-terminated polybutadiene (28,000 MW)-B. F. Goodrich HYCAR CTB Other compositions were produced by first mixing 70 parts by weight of water with five parts by weight of bentonite and continuously stirring for 20 minutes. To this mixture was then added 25 parts by weight barite while stirring. The crosslinking agent was then added to 150 grams of the resulting slurry and stirred for five minutes. The base polymer then was mixed in while stirring. Stirring was continued for 10 minutes. Fann rheology data were taken. The samples were loaded into a sample holder and exposed to a Co-60 source. Each sample received 2MR total dose at a rate of 2MR/hr.

TABLE III

| Sample | Base Polymer (g.) | Cross-Linking Agent (g.) | Bentonite Barite Slurry (g.) | Fann-Plastic Viscosity (cp) | Fann-Yield Point (lb/100 ft$^2$) | Appearance | Compressive Strength (psi.) |
|---|---|---|---|---|---|---|---|
| Slurry | — | — | — | 7 | 10 | — | — |
| III-1 | HTB-1 (5) | TRPGDA (45) | 150 | 11 | 11 | G | 141 |
| III-2 | HTB-1 (10) | TRPGDA (40) | " | 6 | 15 | G | 98 |
| III-3 | HTB-1 (15) | TRPGDA (35) | " | 8 | 9 | G | 76 |
| III-4 | HTB-1 (20) | TRPGDA (30) | " | 3 | 19 | F | 43 |
| III-5 | HTB-1 (5) | TMPTA (45) | " | 9 | 7 | C | — |
| III-6 | HTB-1 (10) | TMPTA (40) | " | 9 | 5 | C | — |
| III-7 | HTB-1 (15) | TMPTA (35) | " | 9 | 4 | C | — |
| III-8 | HTB-1 (20) | TMPTA (30) | " | 8 | 5 | C | — |
| III-9 | HTB-1 (10) | DVDEG (10) | " | 23 | 18 | A | — |
| III-10 | HTB-1 (20) | DVDEG (30) | " | 20 | 17 | A | — |
| III-11 | HTB-1 (10) | TTEGDA (40) | " | 30 | 22 | F | — |
| III-12 | HTB-1 (10) | HDODA (40) | " | — | — | F | — |
| III-13 | HTB-2 (10) | TRPGDA (40) | " | 51 | 37 | G | 168 |
| III-14 | HTB-2 (10) | TRPGDA (40) | " | 30 | 84 | G | 176 |
| III-15 | HTB-2 (20) | TRPGDA (30) | " | 48 | 118 | G | 113 |
| III-16 | HTB-2 (10) | TTEGDA (40) | " | 40 | 52 | G | 68 |
| III-17 | HTB-2 (20) | TTEGDA (30) | " | 40 | 36 | G | 26 |
| III-18 | HTB-3 (5) | TTEGDMA (45) | " | 23 | 7 | G | 81 |
| III-19 | HTB-3 (10) | TTEGDMA (40) | " | 14 | 15 | G | 62 |
| III-20 | HTB-3 (10) | TTEGDMA (50) | " | 19 | 9 | G | 97 |
| III-21 | HTB-3 (10) | TTEGDMA (60) | " | 15 | 16 | — | — |
| III-22 | HTB-4 (5) | TTEGDMA (45) | " | 19 | 11 | G | 94 |
| III-23 | HTB-5 (5) | TTEGDMA (45) | " | 23 | 1 | G | 135 |
| III-24 | HTBN (5) | TRPGDA (45) | " | 13 | 11 | F | 43 |
| III-25 | (10) | (40) | " | 15 | 7 | G | 144 |
| III-26 | (15) | (35) | " | 15 | 9 | G | 163 |
| III-27 | (20) | (30) | " | 10 | 10 | F | 38 |
| III-28 | HTBN | TMPTA | " | 13 | 7 | E | — |

TABLE III-continued

| Sample | Base Polymer (g.) | Cross-Linking Agent (g.) | Bentonite Barite Slurry (g.) | Fann-Plastic Viscosity (cp) | Fann-Yield Point (lb/100 ft$^2$) | Appearance | Compressive Strength (psi.) |
|---|---|---|---|---|---|---|---|
| | (5) | (45) | | | | | |
| III-29 | (10) | (40) | " | 15 | 6 | E | — |
| III-30 | (15) | (35) | " | 16 | 9 | E | — |
| III-31 | (20) | (30) | " | 16 | 6 | E | — |
| III-32 | HTBN (10) | TTEGDA (40) | " | 35 | 52 | — | 24 |
| III-33 | HTBN (20) | TTEGDA (30) | " | 39 | 50 | — | 27 |
| III-34 | HTBN (10) | HDODA (40) | " | 50 | 48 | — | 51 |
| III-35 | VTBNX (5) | TRPGDA (45) | " | 28 | 46 | F | 49 |
| III-36 | (10) | (40) | " | 25 | 32 | G | 92 |
| III-37 | (15) | (35) | " | 20 | 22 | G | 70 |
| III-38 | (20) | (30) | " | 20 | 22 | F | 38 |
| III-39 | VTBNX (5) | TMPTA (45) | " | 16 | 11 | E | — |
| III-40 | (10) | (40) | " | 20 | 18 | E | — |
| III-41 | (15) | (35) | " | 25 | 31 | E | — |
| III-42 | (20) | (30) | " | 24 | 38 | E | — |
| III-43 | VTBNX (10) | DVDEG (40) | " | 25 | 14 | A | — |
| III-44 | (20) | (30) | " | 39 | 11 | A | — |
| III-45 | VTBNX (10) | TTEGDA (40) | " | 42 | 42 | — | 65 |
| III-46 | (10) | (40) | " | 41 | 35 | — | — |
| III-47 | (20) | (30) | " | 43 | 50 | — | 35 |
| III-48 | VTBNX (10) | HDODA (40) | " | 61 | 127 | — | 74 |
| III-49 | HTEC-1 (10) | TTEGDA (40) | " | 41 | 59 | — | 28 |
| III-50 | (10) | (40) | " | 52 | 71 | — | 47 |
| III-51 | HTEC-1 (10) | TRPGDA (40) | " | 0/5 | — | F | — |
| III-52 | HTEC-2 (10) | TTEGDA (40) | " | 38 | 51 | — | 21 |
| III-53 | (10) | (40) | " | 47 | 51 | — | 25 |
| III-54 | (20) | (30) | " | 47 | 52 | — | 25 |
| III-55 | HTEC-2 (10) | TRPGDA (40) | " | 0/5 | — | — | 29 |
| III-56 | PBO (5) | TMPTA (45) | " | 27 | 16 | E | — |
| III-57 | (10) | (40) | " | 27 | 24 | E | — |
| III-58 | (15) | (35) | " | 24 | 22 | E | — |
| III-59 | PBO (5) | TRPGDA (45) | " | 31 | 19 | G | 133 |
| III-60 | (10) | (40) | " | 32 | 26 | G | 109 |
| III-61 | (15) | (35) | " | 32 | 36 | G | 82 |
| III-62 | PBO (5) | TTEGDMA (45) | " | 31 | 13 | G | 183 |
| III-63 | (10) | (40) | " | 33 | 20 | G | 218 |
| III-64 | (15) | (35) | " | 25 | 15 | G | 108 |
| III-65 | PVA-1 (5) | TMPTA (45) | " | 55 | 55 | C | — |
| III-66 | (10) | (40) | " | 88 | 91 | B | — |
| III-67 | (15) | (35) | " | 180 | 186 | D | — |
| III-68 | PVA-1 (5) | TRPGDA (45) | " | — | — | B | — |
| III-69 | PVA-1 (5) | TTEGDMA (45) | " | 48 | 41 | B | — |
| III-70 | PBAA (5) | TRPGDA (45) | " | 57 | 177 | G | 235 |
| III-71 | PBAA (5) | TTEGDMA (45) | " | 43 | 135 | G | 289 |
| III-72 | PBAA | TMPTA | " | 36 | 44 | G | 122 |

TABLE III-continued

| Sample | Base Polymer (g.) | Cross-Linking Agent (g.) | Bentonite Barite Slurry (g.) | Fann-Plastic Viscosity (cp) | Fann-Yield Point (lb/100 ft$^2$) | Appearance | Compressive Strength (psi.) |
|---|---|---|---|---|---|---|---|
| | (5) | (45) | | | | | |

NOTES:
(1) HTB-1 hydroxyl-terminated butadiene polymer-ARCO Polybd R-45HT
HTB-2 hydroxyl-terminated butadiene polymer-B. F. Goodrich Hycar 2000X 166
HTB-3 hydroxyl-terminated butadiene polymer-Polysciences, Inc. 4357
HTB-4 hydroxyl-terminated butadiene polymer-Polysciences, Inc. 6508
HTB-5 hydroxyl-terminated butadiene polymer-Polysciences, Inc. 6079
HTBN hydroxyl-terminated butadiene acrylonitrile polymer-B. F. Goodrich HYCAR 1300x29
VTBNX vinyl-terminated butadiene acrylonitrile polymer with pendant vinyl groups-B. F. Goodrich HYCAR 1300x23
HTEC-1 hydroxyl-terminated epichlorohydrin polymer-B. F. Goodrich Hydrin 10x1
HTEC-2 hydroxyl-terminated epichlorohydrin polymer-B. F. Goodrich Hydrin 10x2
PBO polybutadiene oxide-Polysciences, Inc. 5434
PVA-1 polyvinyl alcohol (125,000 mw)-Aldrich 18,935-9
PBAA polybutadiene acrylonitrile acrylic acid copolymer-Polysciences, Inc. 9757
TRPGDA tripropyleneglycol diacrylate-Celanese
TMPTA trimethylopropane triacrylate-Celanese
DVDEG diethyleneglycol divinyl ether-Polysciences, Inc.
TTEGDA tetraethyleneglycol diacrylate-Celanese
HDODA 1,6-hexanediol diacrylate-Celanese
TTEGDMA tetraethyleneglycol dimethacrylate
(2) Codes for cured solid appearance:
A - no apparent cure
B - very soft-mushy
C - soft putty-like solid
D - soft crumbly solid
E - firm crumbly solid
F - hard crumbly solid
G - firm elastic solid Table IV below lists a series of compositions made using the following procedure to demonstrate the use of chemical initiators.

A slurry for the compositions in Table IV was made by mixing bentonite, water, chrome lignosulfonate, and sodium hydroxide in the same manner and in the same proportions as discussed above prior to Table I.

The resulting slurry was mixed with the polymers and monomers to form a polymeric drilling mud slurry sample having a weight of about 40 grams. To this slurry was added one gram of benzoyl peroxide and 0.5 milliliter of dimethyl-p-toluidine accelerator. The samples were allowed to set at room temperature until hard and the compressive strength measured.

TABLE IV

| Composition (% wt) | | | | | | | Compressive Strength, psi |
|---|---|---|---|---|---|---|---|
| Mud, % | Polymer | % | Polymer | % | Cross-linking Agent | % | |
| 89 | P-250 | 2 | | | TMPTMA | 9 | — |
| 91 | P-35 | 9 | | | — | — | — |
| 84 | P-35 | 8 | | | TMPTMA | 8 | 117 |
| 77 | P-35 | 8 | | | TMPTMA | 15 | 393 |
| 72 | P-35 | 14 | | | TMPTMA | 14 | 506 |
| 72 | VTBN | 21 | | | TMPTMA | 7 | 84 |
| 72 | CTBN | 21 | | | TMPTMA | 7 | — |
| 72 | CTB | 21 | | | TMPTMA | 7 | — |
| 72 | HTBN | 21 | | | TMPTMA | 7 | — |
| 72 | PLIOLITE | 21 | | | TMPTMA | 7 | 47 |
| 67 | VTBN | 20 | Polystyrene | 7 | TMPTMA | 7 | 54 |
| 67 | VTBN | 20 | PMMA | 7 | TMPTMA | 7 | 286 |
| 67 | VTBN | 20 | Polyethylene | 7 | TMPTMA | 7 | 115 |
| 67 | VTBN | 20 | PLIOLITE | 7 | TMPTMA | 7 | — |
| 67 | VTBN | 20 | P-35 | 7 | TMPTMA | 7 | 97 |
| 62 | VTBN | 19 | P-35 | 12 | TMPTMA | 6 | 88 |
| 72 | VTBN | 21 | | | EGDA | 7 | 103 |
| 72 | VTBN | 21 | | | TTEGDA | 7 | 198 |
| 72 | VTBN | 21 | | | NPGDA | 7 | — |
| 72 | VTBN | 21 | | | EGDMA | 7 | 80 |
| 72 | VTBN | 21 | | | DEGDMA | 7 | — |
| 72 | VTBN | 21 | | | TEGDMA | 7 | — |
| 72 | VTBN | 21 | | | TTEGDMA | 7 | — |

TABLE IV-continued

| Mud, % | Polymer | % Polymer | % | Cross-linking Agent | % | Compressive Strength, psi |
|---|---|---|---|---|---|---|
| 72 | VTBN | 21 | | TMPTMA | 7 | 84 |

NOTES:
P-250 polyacrylamide (MW = 5-6 × 10⁶) - American Cyanamid
P-35 polyacrylamide (MW = 4000) - American Cyanamid
VTBN vinyl-terminated butadiene acrylonitrile copolymer - B. F. Goodrich VTBN
CTBN carboxyl-terminated butadiene acrylonitrile copolymer - B. F. Goodrich CTBN
CTB carboxyl-terminated polybutadiene (MW = 28,000) - B. F. Goodrich CTB
HTBN hydroxyl-terminated butadiene acrylonitrile copolymer - B. F. Goodrich HTBN
PLIOLITE styrene-butadiene copolymer - PLIOLITE 56B
Polystyrene polystyrene (MW = 2,100)
PMMA polymethyl methacrylate
Polyethylene polyethylene (MW = 3,500)
EGDA ethylene glycol diacrylate
TTEGDA tetraethylene glycol diacrylate
NPGDA neopentyl glycol diacrylate
EGDMA ethylene glycol dimethacrylate
DEGDMA diethylene glycol dimethacrylate
TEGDMA triethylene glycol dimethacrylate
TTEGDMA tetraethylene glycol dimethacrylate
TMPTMA trimethylolpropane trimethacrylate FIGS. 3A through 3D disclose the most desirable method of using the settable drilling mud composition disclosed herein in a primary cementing job after production casing is set in place. The process also may be used in cementing surface casings and other casings.

Figure 3A:
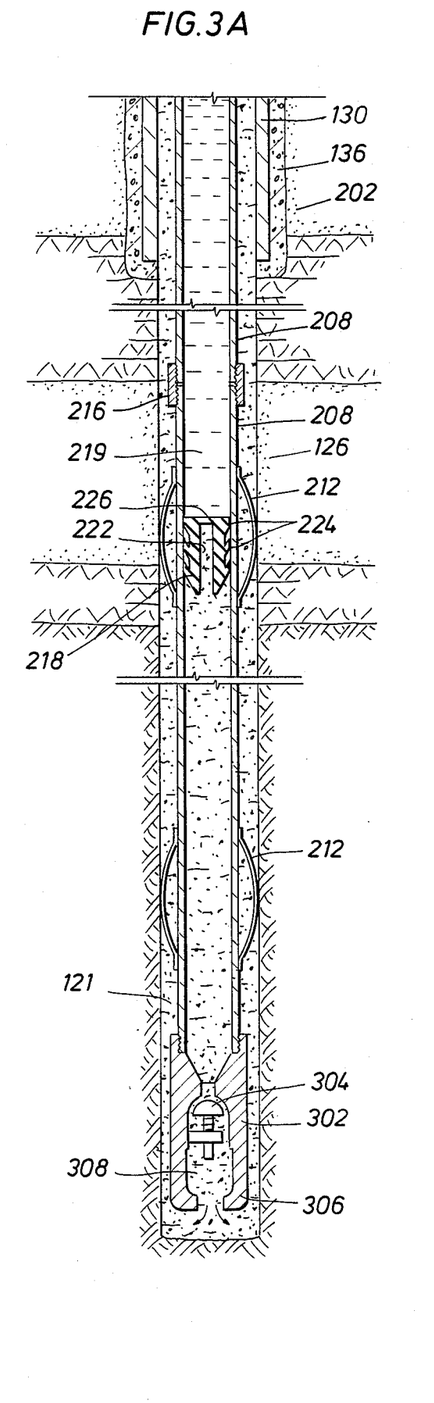
FIG. 3A is a cross-sectional elevation view showing the first step in the disclosed process.

In FIG. 3A the well passes down from the surface and through various subterranean formations including a fresh water aquifer 202 and a producing formation 126. The well should have a surface casing 130 which is held in place by a cement sheath 136. The cement sheath 136 may be formed by using this process.

The production casing string found in FIG. 3A desirably is made up of a float shoe 302 and a number of joints of steel production casing 208 joined by collars 216. The float shoe 302 has the same function as do the combination of the casing shoe 204 and float collar 206 shown in FIGS. 2A through 2D. Since the cement of the invention is not selfsetting, the placement of the float shoe 302 is very low in the casing string to allow, if necessary, irradiation of all the settable drilling mud. The purpose of the float shoe 302 is multiple. It prevents distortion or abrasion of the production casing as it is introduced into the well and forced past obstructions on the wall of the wellbore. Float shoe 302 contains a back-pressure or check valve 304 which permits flow only in a downward direction. The lower end of the float shoe, often called the snout or guide 306, is usually made of cement or cast iron. A number of casing centralizers 212 may be attached at intervals along the casing string to maintain the string in the center of the wellbore. The centralizers may have the effect of slightly bending the casing string so that it follows the general path of the borehole. Since in using this process no benefit is gained in removing filter cakes or gelled mud from the annular space, the traditional scratchers may be omitted from the exterior of the casing.

FIG. 3A illustrates the initial step in the inventive process. The fluid found in the wellbore at the beginning of this process is the disclosed settable drilling fluid without the presence of a chemical initiator. A bottom plug 218 is inserted into the casing string and settable drilling fluid 219 containing the proper amount of the chemical initiators discussed above is pumped in above it. Bottom plug 218 has a longitudinal hole 222 formed through its center, a number of wipers 224 formed circumferentially about its outer surface, and a rupturable diaphragm 226 to temporarily prevent the flow of cement through hole 222. As the settable drilling fluid containing initiator 219 is pumped into the casing string, it pushes bottom plug 218 down toward float shoe 302. The movement of the bottom plug 218 in turn forces the drilling mud 121 to flow down the casing string, out the float shoe 302, up the wellbore annulus, and out the wellbore at the surface. Check valve 304 is held open by the flow of drilling mud through float shoe 302. The wipers 224 on the exterior of bottom plug 218 provide a barrier between the two drilling fluids in the casing string and wipe the lower settable drilling mud from the casing string's interior surface.

Figure 3B:
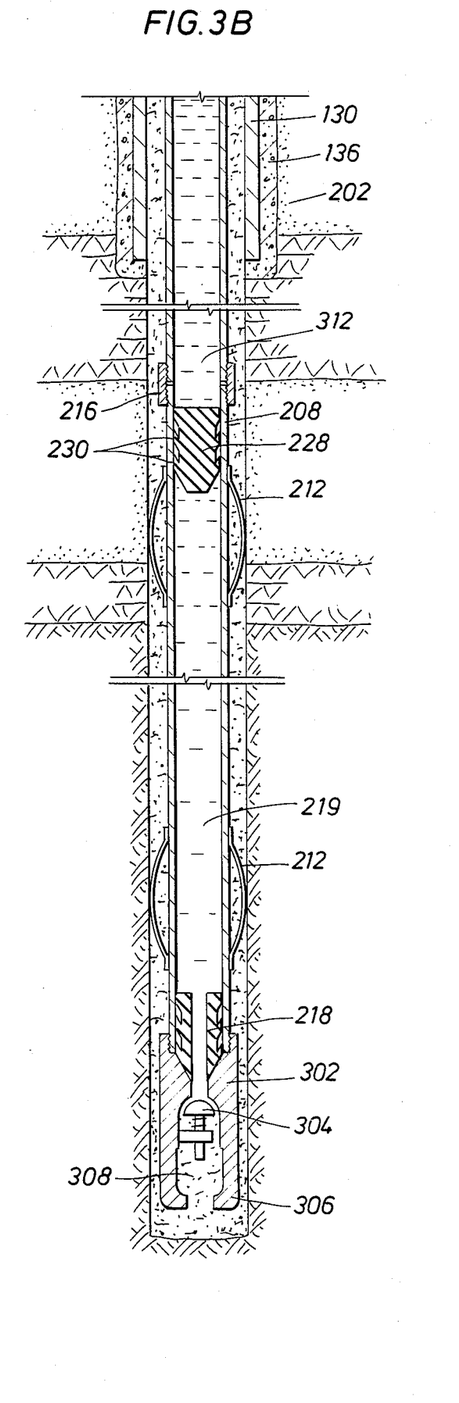
FIG 3B is a cross-sectional elevation view showing the second step in the disclosed process.

FIG. 3B shows the following step in the process. Bottom plug 218 has seated against the upper surface of float shoe 302 and the diaphragm 226 has broken. The settable drilling fluid containing initiator 219 flows through float shoe 302 and up the annulus. Back-pressure valve 304 is held open by the downward flow of initiator-containing drilling fluid 219. When a selected amount of drilling fluid containing initiator 219 is introduced into the casing string, top plug 228 is inserted into the string. The amount of drilling fluid containing initiator is desirably about equal to the amount necessary to fill the annular space between the casing string and the borehole wall. Top plug 228 also has wipers 230 to separate the drilling fluid 219 and the displacement fluid 312.

Figure 3C:
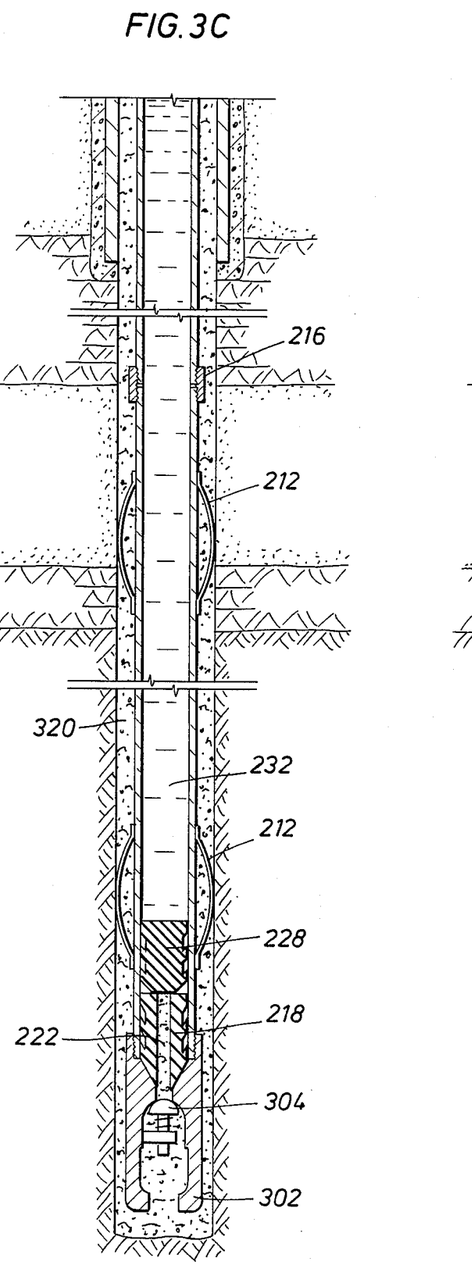
FIG. 3C is a cross-sectional elevation view showing the optional irradiation step in the disclosed process.

FIG. 3C shows the completion of the step in which the settable drilling fluid containing no initiator has been at least partially displaced by that fluid containing chemical initiators. Unlike prior art processes, the displacement need not be complete. The remaining filter cakes and quiescent volumes found in the wellbore will polymerize into a cementitious material because of the proximity of the drilling fluid containing initiator. In FIG. 3C, top plug 228 has been forced down into contact with bottom plug 218 thereby closing the longitudinal hole 222 through bottom plug 218. The addition and pumping of displacement fluid 232 is terminated and the pressure lowered. Back pressure valve 304 in float shoe 302 closes and prevents the mixture of settable drilling muds found in the wellbore annulus from flowing back up the casing string. The original drilling fluid and the drilling fluid containing initiator should be sufficiently mixed that polymerization will begin and result in a cementitious material holding the casing string in place.

Figure 3D:
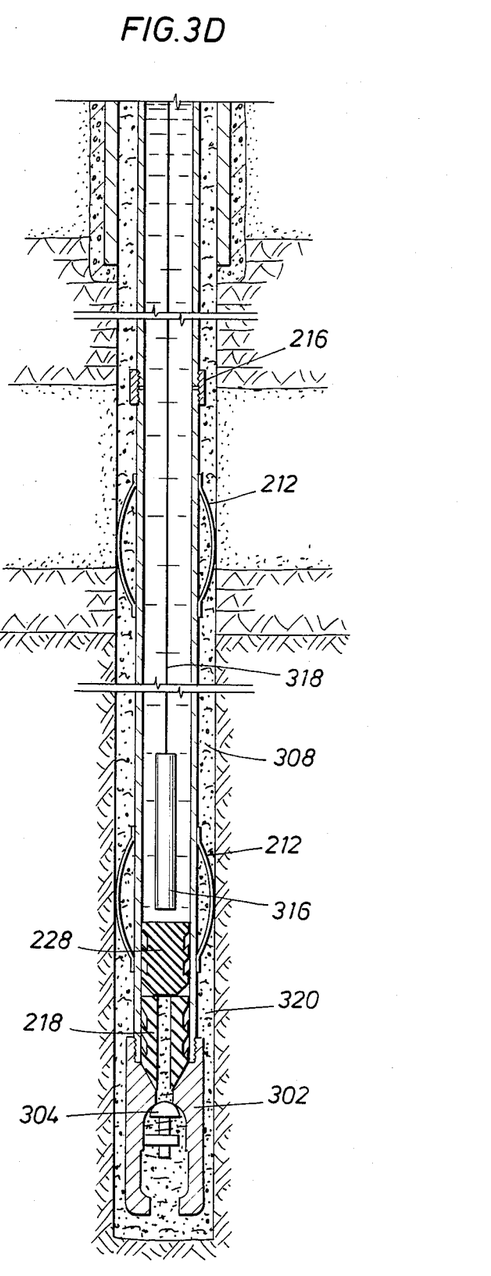
FIG 3D is a cross-sectional elevation view showing the perforations used to produce hydrocarbons after the casing has been cemented. The perforating tool is depicted in place hanging from a wireline.

FIG. 3D discloses the optional step of irradiating the settable drilling mud 308 thereby increasing the setting rate. The radioactive source 316 may be composed of any suitable radioactive material although the preferable materials are gamma ray emitters such as Cobalt-60, Zinc-65, Cesium-137, Tantalum-182, and Iridium-192. The most preferable source is Cobalt-60, because of its ready availability, in an amount capable of providing a dose rate of about 0.1 to about 10.0 Mrad/hour in the settable drilling mud found in the particular well geometry. The total dosage may range from 0.1 to 50 Mrad. Lower dosages are preferred in that, depending upon the polymer system chosen, undesirable chainbreaking or scission reactions may occur more readily at the higher dosages and rates.

As noted above, the pressure on the casing string is kept at a low level and the irradiation tool 316 is inserted into the casing string on a wire line 318. The tool is lowered to the region of the float shoe 302 and retrieved. The rate of insertion and withdrawal is such that the total dosage received by each incremental volume of mud is sufficient to polymerize the polymerizable material in the settable drilling mud 308, and thereby form a cementitious solid sheath 320. Multiple passes are also contemplated. The casing string is then firmly locked in place by the various casing protuberances, e.g., float shoe 302, centralizers 212, and collars 216.

After the settable drilling mud has hardened sufficiently, the well may be perforated for production in the manner shown in FIG. 2D, supra.

It should be understood that the foregoing disclosure and description are only illustrative and explanatory of the invention. Various changes in the components of the composition and method of using that composition as well as in the details of the illustrated process may be made within the scope of the appended claims without departing from the spirit of the invention.

I claim as my invention:

1. A method for drilling and primary cementing a well comprising the steps of:
   drilling a well using a hollow drill string having a drill bit with at least one orifice communicating between the inside of the hollow drill string and the outside and located at the lower end of said drill string so as to produce a wellbore,
   circulating, while drilling, a drilling fluid comprising:
      at least one polymeric material containing at least one double bond and capable of being cross-linked with a monomeric cross-linking agent, said polymeric material being selected from the group consisting of: vinyl-, hydroxyl-, carboxyl-terminated butadiene acrylonitrile copolymers, metharylic acid-methacrylate ester copolymers; polyethylene; polyacrylamide; polybutadiene; hydroxyl- or carboxyl-terminated polybutadiene; hydroxyl-terminated epichlorohydrin polymers; polybutadiene oxide; polyvinyl alcohol; or polybutadiene acrylonitrile acrylic acid copolymer,
      at least one monomeric cross-linking agent containing at least one double bond and being selected from the group consisting of: ethylene glycol diacrylate, tetraethylene glucol diacrylate, neopentyl glycol diacrylate, tetrapropylene glycol diacrylate, trimethylolpropane triacrylate, ethylene glycol dimethyacrylate, triethylene glycol dimethacrylate, tetraethylene glycol diomethacrylate, trimethylolpropane trimethacrylate, dicyclopentenyl oxyethyl methacrylate, divinyl benzene, 1,6-hexoandiol diacrylate, tripropylene glycol diacrylate, diehyleneglycol divinyl ether,
      water, and
      at least one clay,
   down the inside of said drill string and out said at least one orifice,
   withdrawing said drill string from said wellbore,
   installing a float shoe having an upper seating surface on the lower end of a first section of well casing,
   assembling a casing string by sequentially attaching additional sections of casing to said first section of well casing and inserting the casing string farther into the wellbore,
   inserting a bottom plug into said casing string, said bottom plug having a longitudinal passage closed on an upper end by a rupturable diaphragm,
   pumping an additional amount of said drilling fluid containing a chemical initiator adapted to harden said drilling fluid into said casing string above said bottom plug, thereby moving said bottom plug downward in said casing string,
   inserting a closing plug into said casing string, said closing plug having circumferential wipers,
   moving said closing plug down said casing string above said closing plug so as to rupture said rupturable diaphragm and to substantially displace said drilling fluid from the inside of said casing string,
   whereby the drilling fluid remaining on the outside of the casing string cures into a cementitious material.

2. The process of claim I wherein said chemical initiator comprises a member selected from the group consisting of benzoyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methyl ethyl ketone peroxide, dibutylperoxy cyclohexane, di-(2,4-dichlorobenzoyl) peroxide, diisobutyryl peroxide, t-butyl perbenzoate, t-butyl peracetate, and 2,2'-bisazoisobutyronitrile.

3. The process of claim 1 wherein said chemical initiator is hydrogen peroxide, ammonium peroxydisulfate, potassium peroxydisulfate, or sodium peroxydisulfate.

4. The process of claim 1 wherein said chemical initiator is an alkali metal, ammonium, or organic salt of percarbonic acid, perphosphoric acid, a sulfo-peracid, perboric acid, performic acid, or peracetic acid.

5. The process of claim 2 wherein said chemical initiator additionally contains a compound selected from the group consisting of ammonium or alkali metal salts of sulfite, thiosulfite or bisulfite, dimethyl-p-toluidine, dimethylaniline, diethanolamine, triethylene tetramine, and acetic acid.

6. The process of claim 1 wherein the chemical initiator comprises benzoyl peroxide and dimethyl-p-toluidine.

7. The process of claim 1 wherein said drilling fluids also contain weighting agents selected from the group consisting of barite, iron ore, lead sulfide, ferrous oxide, and titanium dioxide.

8. The process of claim 1 wherein said at least one clay is bentonite or attapulgite.

9. The process of claim 1 wherein said at least one polymeric material comprises polybutadiene oxide and said at least one monomeric cross-linking agent comprises tripropylene glycol diacrylate.

10. The process of claim 1 wherein said displacement fluid is water.

11. The process of claim 1 additionally including the step of inserting a radioactive source into the casing string after said closing plug has moved down said casing string and passing said radioactive source along the length of the casing string.

12. The process of claim 11 wherein said radioactive source is passed along the length of said casing string more than one time.

13. The process of claim 11 wherein said radioactive source is of a size and is passed along the length of said casing string so as to produce a dose rate on the outside of the casing string between about 0.1 to about 10.0 Mrad/hr.

14. The process of claim 11 wherein said radioactive source is of a size and is passed along the length of said casing string so as to produce a total dosage on the outside of the casing string between about 0.1 and 50 Mrads.

15. The process of claim 11 wherein the radioactive source comprises Cobalt-60.

16. The wellbore cement sheath made by the process of claim 1.

17. A method for primary cementing a well having a wellbore comprising the steps of:
inserting a casing string having a diameter lessthan that of the wellbore into said wellbore containing a drilling fluid comprising:
at lest one polymeric material containing at least one double bond and capable of being cross-linked with a monomeric cross-linking agent, said polymeric material being selected from the group consisting of: vinyl-, hydroxyl-, carboxyl-terminated butadiene acrylonitrile copolymers; polyethylene; polyacrylamide; polybutadiene; hydroxyl- or carboxy-terminated polybutadiene, hydroxyl-terminatedpichlorohydrin polymers; polybutadiene oxide; polyvinyl alcohol; or polybutadiene acrylonitrile acrylic acid copolymer,
at least one monomeric cross-linking agent containing at least one double bond and being selected from the group consisting of: ethylene glycol diacrylate, tetraethylene glycol diacrylate, neopentyl glycol diacrylate, tetrapropylene glycol diacrylate, trimethylolpropane triacrylate, ethylene glycol dimethacrylate, triethylene glycol dimethacrylate, tetraethyleene glycol dimethacrylate, trimethylolpropane trimethacrylate, dicyclopentenyl oxyethyl methacrylate, divinyl benzene, 1,6-hexandiol diacrylate, tripropylene glycol diacrylate, diethyleneglycol divinyl ether,
water, and
at least one clay,
adding a selected amount of said drilling fluid containing a chemical intiator adapted to harden said drilling fluid to said casing string,
displacing said drilling fluid from the interior of the casing string into the annular space between the wellbore and the outside of the casing string,
whereby said drilling fluids outside said casing string cure into a cementitious material.

18. The process of claim 17 wherein said chemical initiator comprises a member selected from the group consisting of: benzoyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methyl ethyl ketone peroxide, dibutylperoxy cyclohexane, di-(2,4-dichlorobenzoyl)peroxide, diisobutyryl peroxide, t-butyl perbenzoate, t-butyl peracetate, and 2,2'-bisazoisobutyronitrile.

19. The process of claim 17 wherein said chemical initiator is hydrogen peroxide, ammonium peroxydisulfate, potassium peroxydisulfate, or sodium peroxydisulfate.

20. The process of claim 17 wherein said chemical initiator is an alkali metal, ammonium, or organic salt of percarbonic acid, perphosphoric acid, a sulfo-peracid, perboric acid, performic acid, or peracetic acid.

21. The process of claim 18 wherein said chemical initiator additionally contains a compound selected from the group consisting of ammonium or alkali metal salts of sulfite, thiosulfite or bisulfite, dimethyl-p-toluidine, dimethylaniline, diethanolomine, triethylene tetramine, and acetic acid.

22. The process of claim 17 wherein the chemical initiator comprises benzoyl peroxide and dimethyl-p-toluidine.

23. The process of claim 17 wherein said drilling fluids also contain at least one weighting agent selected from the group consisting of barite, iron ore, lead sulfide, ferrous oxide, and titanium dioxide.

24. The process of claim 17 wherein said at least one clay is bentonite or attapulgite.

25. The composition of claim 17 wherein said at least one polymeric material comprises polybutadiene oxide and said at least one monomeric cross-linking agent comprises tripropylene glycol diacrylate.

26. The process of claim 17 additionally including the step of inserting a radioactive source into the casing string after the drilling fluids have been displaced from the interior of the casing string and passing said radioactive source along the length of said casing string.

27. The process of claim 26 wherein said radioactive source is passed along the length of said casing string more than one time.

28. The process of claim 26 wherein said radioactive source is of a size and is passed along the length of said casing string so as to produce a dose rate on the outside of the casing string between about 0.1 to about 10.0 Mrad/hr.

29. The process of claim 26 wherein said radioactive source is of a size and is passed along the length of said casing string so as to produce a total dosage on the outside of the casing string between about 0.1 and 50 Mrads.

30. The process of claim 26 wherein the radioactive source comprises Cobalt-60.

31. The cementitious material is made by the process of claim 19.

* * * * *